United States Patent
Takei et al.

(10) Patent No.: US 6,941,772 B2
(45) Date of Patent: Sep. 13, 2005

(54) APPARATUS AND METHOD FOR MANUFACTURING GLASS-BASE-MATERIAL

(75) Inventors: Junichiro Takei, Gunma-ken (JP); Tadakatsu Shimada, Gunma-ken (JP); Hideo Hirasawa, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 327 days.

(21) Appl. No.: 10/188,863

(22) Filed: Jul. 5, 2002

(65) Prior Publication Data

US 2003/0005726 A1 Jan. 9, 2003

(30) Foreign Application Priority Data

Jul. 6, 2001 (JP) ........................................ 2001-205578

(51) Int. Cl.[7] .............................................. C03B 37/07
(52) U.S. Cl. .............................. 65/382; 65/484; 65/421
(58) Field of Search ....................... 65/377, 384, 29.12, 65/378, 382, 484, 485

(56) References Cited

U.S. PATENT DOCUMENTS 5,183,490 A * 2/1993 Mikami et al. ............... 65/144

FOREIGN PATENT DOCUMENTS

| EP | 0 482 348 A2 | 9/1991 |
|---|---|---|
| JP | 63-285131 | 11/1988 |
| JP | 02-167838 | 6/1990 |
| JP | 2-167838 | 6/1990 |
| JP | 04-260633 | 9/1992 |
| JP | 04-292434 | 10/1992 |
| JP | 05-319850 | 12/1993 |
| JP | 06-329432 | 11/1994 |
| JP | 2000-086271 | 3/2000 |

OTHER PUBLICATIONS

English Translation of JP63–285131, Translated by FLS, Inc., Nov. 2004.*

* cited by examiner

Primary Examiner—Steven P. Griffin
Assistant Examiner—Lisa Herring
(74) Attorney, Agent, or Firm—McGinn & Gibb, PLLC

(57) ABSTRACT

An apparatus for manufacturing a glass-base-material, which is a base material of an optical fiber, includes a driving unit that drives a glass rod around an axis of the glass rod; a burner for accumulating glass soot around outside surface of the glass rod, which is driven by the driving unit, to form the glass-base-material; a weight-deducting unit, on which the driving unit is mounted, for deducting a predetermined weight from a total weight of the driving unit and the glass-base-material formed by the burner; and a measuring unit provided under the weight-deducting unit for measuring the total weight, from which the predetermined weight is deducted by the weight-deducting unit.

21 Claims, 2 Drawing Sheets

US 6,941,772 B2

APPARATUS AND METHOD FOR MANUFACTURING GLASS-BASE-MATERIAL

This patent application claims priority from a Japanese patent application No. 2001-205578 filed on Jul. 6, 2001, the contents of which are incorporated herein by reference.

BACKGROUND OF THE INVENTION

1. Field of the Invention

The present invention relates to apparatus and method for manufacturing a glass-base-material. More particularly, the present invention relates to apparatus and method for manufacturing a glass-base-material that measures the weight of glass soot accumulated on the glass rod.

2. Description of the Related Art

FIG. 1 shows an apparatus for manufacturing a glass-base-material, which is a base material of an optical fiber, using outside vapor deposition (OVD) method. The glass-base-material manufacturing apparatus has a chamber 1, a burner 2, bases 3, a rotation unit 4, measuring unit 7, chucks 8, bearings 9, and a drive shaft 13. The glass-base-material manufacturing apparatus is installed on a common base 10. The chamber 1 accommodates the burner 2, the bases 3, the rotation unit 4, the chucks 8, the bearings 9, and the drive shaft 13.

The chucks 8 hold both ends of the glass rod 5. The drive shaft 13 connects the chuck 8 and the rotation unit 4 to transfer the movement of the rotation unit 4 to the chuck 8. The rotation unit 4 rotates each end of the glass rod 5 by rotating the chucks 8 via the drive shaft 13. The bearing 9 is provided between the chuck 8 and the rotation unit 4 to support the drive shaft 13.

The burner 2 hydrolyzes a raw material gas, which is a base material of a glass-base-material, into glass soot and accumulates the glass soot around the outside surface of the glass rod 5, which is rotated by the rotation unit 4, to form a glass-base-material 150. The burner 2 also moves along the longitudinal direction of the glass rod 5 to accumulate the glass soot evenly along the longitudinal direction of the glass rod 5. After the glass-base-material 150 is manufactured, the glass-base-material 150 is sintered in the heat furnace to be dehydrated and vitrified to become a preform.

If the glass soot is accumulated unevenly around the glass rod 5, the cross section of the preform, which is made by sintering this glass-base-material 150, does not have an accurate circle shape. Also, the core/clad ratio becomes inconstant along the longitudinal direction of the glass rod 5. Therefore, it is important to control the rate of increase in the weight of glass-base-material 150. To control the rate of increase in the weight of glass-base-material 150, it is important to measure the weight of glass-base-material 150 accurately.

Therefore, conventionally, the total weight of the chamber 1 that includes the weight of the bases 3, the rotation units 4, the chucks 8, and the bearings 9 are measured by the measuring unit 7. Then, the weight of the glass-base-material 150 is measured by deducting the tare weight, which is the initial weight measured before the beginning of the accumulation process of the glass soot, from the measured total weight.

It was difficult to measure the weight of the glass-base-material 150 accurately by the conventional method because the size of the measuring unit has to be large enough to measure the total weight of the glass-base-material manufacturing apparatus including the weight of the chamber 1.

FIG. 2 shows an apparatus described in Japanese Patent Application Laying-Open No. 2000-86271. The apparatus shown in FIG. 2 has a bearing case 11, which accommodates a plurality of bearings 9A that support the drive shaft 13A. A measuring unit 7 is provided under the bearing case 11 to support the bearing case 11. The measuring unit 7 measures the weight of the glass-base-material 150 by measuring the weight of the bearing case 11. A revolute joint 12 joins the drive shaft 13A supported by the bearings 9A and the drive shaft 13B supported by the bearing 9B.

During the accumulation process of the glass soot, the glass rod 5 may expand or deflect along the axial direction because of the heat applied on the glass rod 5. Therefore, the moment of the rotation of the glass rod 5 around the axis of the glass rod 5 becomes uneven and causes friction on the revolt joint 12 which influences the accuracy of measuring the weight of the glass-base-material 150. Thus, the apparatus shown in FIG. 2 could not accurately measure the weight of the glass-base-material 150.

SUMMARY OF THE INVENTION

Therefore, it is an object of the present invention to provide apparatus and method for manufacturing a glass-base-material, which is a base material of an optical fiber, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an apparatus for manufacturing a glass-base-material, which is a base material of an optical fiber, the apparatus comprises: a driving unit that drives a glass rod around an axis of the glass rod; a burner for accumulating glass soot around outside surface of the glass rod, which is driven by the driving unit, to form the glass-base-material; a weight-deducting unit, on which the driving unit is mounted, for deducting a predetermined weight from a total weight of the driving unit and the glass-base-material formed by the burner; and a measuring unit provided under the weight-deducting unit for measuring the total weight, from which the predetermined weight is deducted by the weight-deducting unit.

The weight-deducting unit may have a base supported by a balance shaft, which includes a supporting member, so that the base rotates around the balance shaft; and a counterweight mounted on the base to balance the weight of the driving unit with the weight of the glass-base-material. The counterweight may be arranged on one end of the base, and the measuring unit is arranged under other end of the base across the balance shaft.

According to the second aspect of the present invention, a method for manufacturing a glass-base-material, which is a base material of an optical fiber, comprises the steps of driving a glass rod using a driving unit; accumulating glass soot around outside surface of the glass rod driven by the driving unit to form the glass-base-material; deducting a predetermined weight from a total weight of the glass-base-material and the driving unit; and measuring the total weight, from which the predetermined weight is deducted by the deducting; and controlling a rate of increase in weight of the glass-base-material based on the total weight measured by the measuring.

The deducting step may have mounting a counterweight on one end of a base, which is supported by a balance shaft so that the base rotates around the balance shaft, the weight of the driving unit and the glass-base-material being applied on the base; and measuring weight applied on other end of the base.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiments are not necessarily essential to the invention.

Figure 3:
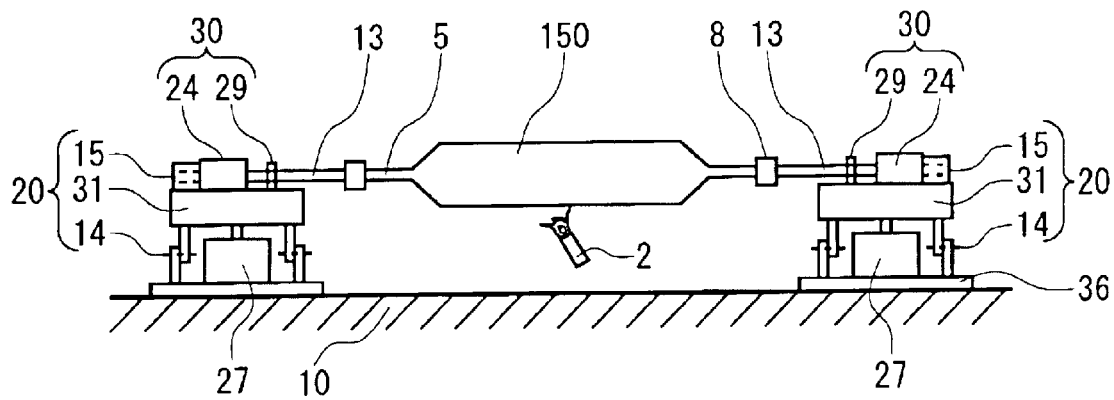
FIG. 3 shows a configuration of a glass-base-material manufacturing apparatus 200 of the present embodiment.

FIG. 3 shows a configuration of a glass-base-material manufacturing apparatus 200 of the present embodiment. The glass-base-material manufacturing apparatus 200 has a burner 2, a rotation unit 30, measuring unit 27, chucks 8, bearings 29, drive shafts 13, and weight-deducting units 20. The glass-base-material manufacturing apparatus 200 is installed on a common base 10. The chucks 8 hold both ends of a glass rod 5. The drive shaft 13 connects the chuck 8 and the rotation unit 30 to transfer the movement of the rotation unit 30 to the chuck 8 via the drive shaft 13. The rotation unit 30 is an example of the driving unit that drives the glass rod 5. The rotation unit 30 has a motor 24 that rotates the glass rod 5 by rotating the chuck 8 which is connected to the drive shaft 13. The rotation unit 30 also has a bearing 29 that supports the drive shaft 13.

The burner 2 hydrolyzes a raw gas material, which is a base material of a glass-base-material, into glass soot and accumulates the glass soot around the outside face of the glass rod 5, which is rotated by the rotation unit 30, to form a glass-base-material 150. The burner 2 also moves along the longitudinal direction of the glass rod 5 to accumulate the glass soot evenly along the longitudinal direction of the glass rod 5.

The weight-deducting unit 20 deducts a predetermined weight from a total weight of the rotation unit 30 and the glass-base-material 150. The measuring unit 27 measures the weight of the glass-base-material 150. A load cell may be used for the measuring unit 27. The rotation unit 30 and the weight-deducting unit 20 are provided on both ends of the glass rod 5.

Figure 2:
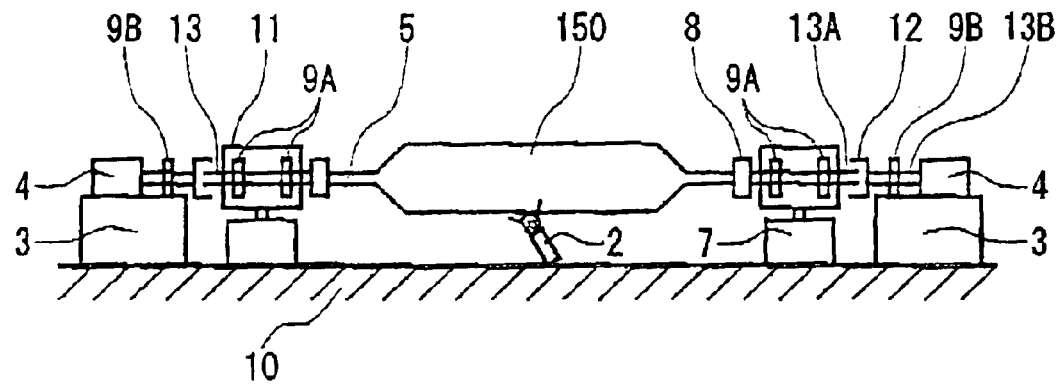
FIG. 2 shows a precise perspective view of the glass-base-material manufacturing method 200 shown in FIG. 1.
Figure 4:
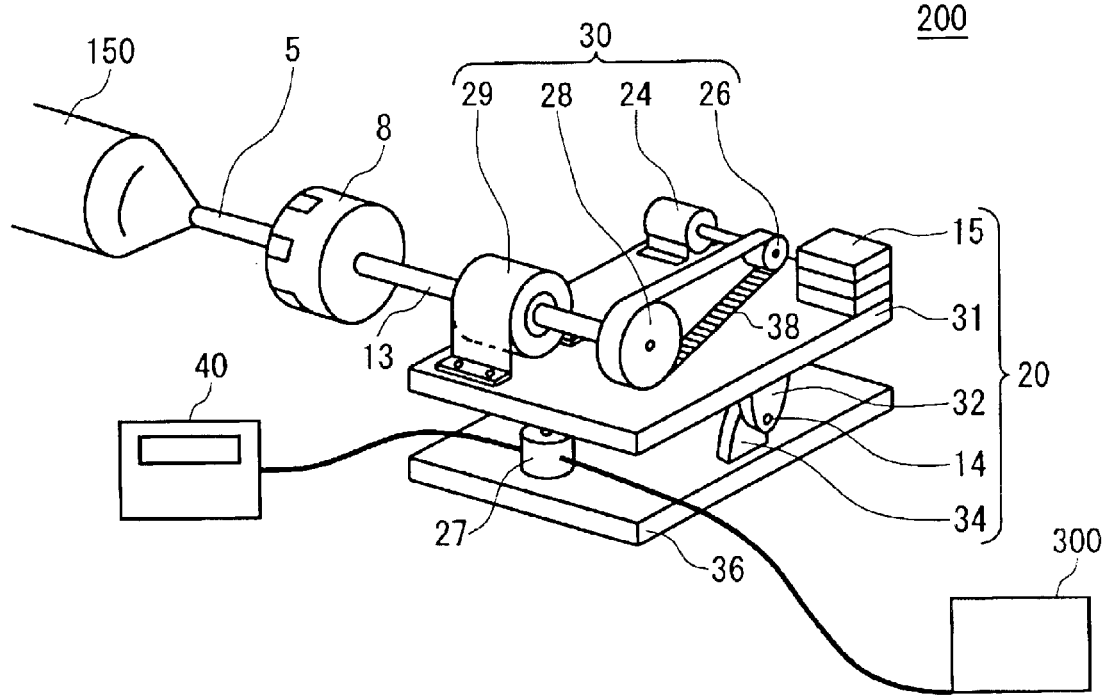
FIG. 4 shows a precise perspective view of the glass-base-material manufacturing method 200 shown in FIG. 3.

FIG. 4 shows a precise perspective view of the glass-base-material manufacturing method 200 shown in FIG. 3. As shown in FIG. 2, the weight-deducting unit 20 has a counterweight 15, an upper base 31, an upper stay 32, a lower stay 34, and a lower base 36.

The rotation unit 30 and the counterweight 15 are mounted on the upper base 31. The upper stays 32 are formed on both ends of the upper base 31 such that the upper stays 32 protrude downward from the upper base 31. The upper stays 32 are arranged substantially on the centerline of the upper base 31. The lower base 36 is mounted on the common base 10 and provided under the upper base 31. The lower stays 34 are formed on both ends of the lower base 36 such that the lower stays 34 protrude upward from the lower base 36 and contact to the corresponding upper stays 32. The lower stays 34 are arranged substantially on the centerline of the lower base 36. The balance shaft 14 connects the upper stays 32 and the lower stays 34 such that the upper base 31 can rotate around the balance shaft 14.

The motor 24 and the counterweight 15 are arranged on the right-hand end of the upper base 31. The drive shaft 13 and the bearing 29, to which the glass-base-material 150 are connected, is arranged on the left-hand end of the upper base 31 across the balance shaft 14. The measuring unit 27 is provided under the left-hand end of the upper base 27, above which the drive shaft 13 and the bearing 29 are arranged. The rotation unit 30 further has a drive pulley 26 connected to the motor 24, a driven pulley connected to the driving shaft 13, and a belt 38 that transfers the movement of the drive pulley 26 to the driven pulley 28.

The glass-base-material manufacturing apparatus 200 measures the weight of the glass-base-material 150 and the rotation unit 30 using the upper base 31, the counterweight 15, and measuring unit 27. In the present embodiment, the upper base 31 functions as a balance and the balance shaft 14 functions as a fulcrum of a balance. The counterweight 15 having a predetermined weight is provided on one end of the upper base 31 in order to balance the weight of the rotation unit 30 with the weight of the glass-base-material 150. The measuring unit 27 is provided under another end of the upper base 31 across the balance shaft 14. Thus, the measuring unit 27 measures the weight, which is balanced by the counter-weight 15.

Therefore, the present glass-base-material manufacturing apparatus 200 can reduce the size of the measuring unit 27 by mounting the counterweight 15 on the upper base 31 to deduct a predetermined weight from the weight to be measured by the measuring unit 27. Because the present glass-base-material manufacturing apparatus 200 can use the measuring unit 27, the size of which is smaller than the size of the measuring unit of a conventional glass-base-material manufacturing apparatus, the present glass-base-material manufacturing apparatus 200 can measure the weight of the glass-base-material 150 accurately. The weight of the counterweight 15 may be determined according to the sensitivity of the measuring unit 27.

The upper stays 32 and the balance shaft 14 may be arranged between the end of the upper base 31 and the centerline of the upper base 31. In this case, the weight of the counterweight 15 can be reduced by the lever rule.

The measuring unit 27 further has a display 40 that displays the measured weight. In this case, the counterweight 15 having weight of the rotation unit 30 is mounted on the upper base 31 to cancel the weight of the rotation unit 30 such that the weight displayed on the display 40 shows zero before the beginning of the accumulation of the glass soot. Thus, the measuring unit 27 can measure only the weight of the glass-base-material 150 so that the display 40 shows only the weight of the glass-base-material 150 during the accumulation of the glass soot.

In this way, the measuring unit 27 can accurately measure the weight of the glass-base-material 150 at a predetermined time interval during the accumulation of the glass soot. The control unit 300 detects the change in the weight of the glass-base-material 150 against the predetermined weight or the rate of increase of the glass-base-material 150. The control unit 300 then controls the supply of the raw material gas to the burner 2 to control the rate of increase in the weight of the control unit 300 based on the weight measured by the measuring unit 27.

Figure 1:
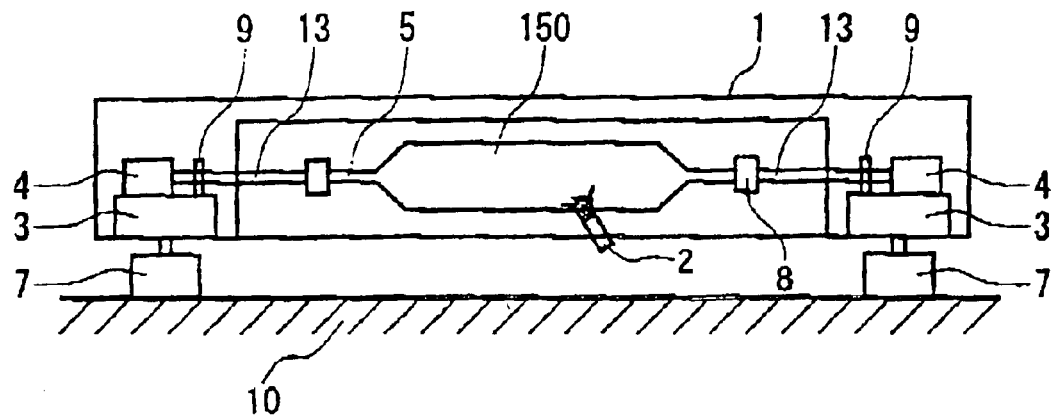
FIG. 1 shows an apparatus for manufacturing a glass-base-material, which is a base material of an optical fiber, using outside vapor deposition (OVD) method.

As described above, the glass-base-material manufacturing apparatus 200 of the present embodiment does not have to measure the weight of the chamber 1 as shown in FIG. 1 by using the upper base 31 that functions as a balance and the counterweight 15 that balances the weight of the rotation unit 30 with the weight of the glass-base-material 150. Thus, the glass-base-material manufacturing apparatus 200 can use a measuring unit 27, the size of which is smaller than the size of the measuring unit used in the conventional glass-base-material manufacturing apparatus shown in FIG. 1 or FIG. 2. Therefore, the glass-base-material manufacturing apparatus 200 can use a measuring unit 27, the accuracy of which is better than the accuracy of the measuring unit used in the conventional glass-base-material manufacturing apparatus shown in FIG. 1 or FIG. 2. Therefore, the present embodiment can increase the accuracy of measuring the weight of the glass-base-material 150.

EXAMPLE

A glass-base-material 150 was manufactured using a glass-base-material manufacturing apparatus shown in FIG. 3. First, a counterweight 15, the weight of which is 150 kg, was mounted on each upper base 31 of the weight-deducting units 20 to deduct a predetermined weight from the weight to be measured by the measuring unit 27 before the beginning of the accumulation of the glass soot.

Then, the rotation unit 30 rotated the glass rod 5, and the burner 2 moved along the longitudinal direction of the glass rod 5 while ejecting the glass soot onto the outside surface of the glass rod 5 to accumulate the glass soot around the glass rod 5. During accumulating the glass soot around the glass rod 5, the measuring unit 27 measured the weight of the glass-base-material 150 at a predetermined time interval. The control unit 300 controlled the amount of raw material gas supplied to the burner 2 based on the weight measured by the measuring unit 27. Thus, the rate of increase in the weight of the glass-base-material 150 was accurately controlled by the control unit 300. The measuring unit for 250 kg was used for each of the measuring units 27 provided on both ends of the glass rod 5.

At the time just before finishing the accumulation process, at which the weight of the glass-base-material 150 becomes the maximum, the weight of the glass-base-material 150 was 60 kg, and the weight of the each rotation unit 30 provided at both ends of the glass rod 5 was 300 kg. Therefore, the total weight of the glass-base-material 150 and the rotation units 30 was 660 kg. As a result of deducting the predetermined weight of 150 kg from the weight to be measured by each measuring unit 27, the measuring unit 27 for 250 kg was enough to measure the weight of the glass-base-material 150. The error of the measuring unit 27 was 0.125 kg.

After finishing the accumulation process, the glass-base-material 150 was sintered in the heat furnace to be dehydrated and vitrified to be a preform. The core/clad ratio of the manufactured preform was measured. The cross section of the manufactured preform was an accurate circle. The core/clad ratio was constant along the longitudinal direction of the glass rod 5.

Comparative Example

A glass-base-material was manufactured using a glass-base-material manufacturing apparatus shown in FIG. 1. Other conditions were the same as the conditions of the above-mentioned EXAMPLE.

At the time just before finishing the accumulation process, the weight of the whole chamber 1 was 1500 kg, and the weight of the glass-base-material 150 was 60 kg. The measuring unit, which is used for measuring 1000 kg, was used for both ends of the glass rod 5. The error of the measuring unit 7 was 0.5 kg because the accuracy of the measuring unit 7 was 0.05% of that of the full scale. Therefore, the rate of increase in the weight of the glass-base-material 150 could not be measured accurately. Thus, the cross section of the manufactured preform was not an accurate circle, and the core/clad ratio was not constant along the longitudinal direction of the glass rod 5.

Although the present invention has been described by way of exemplary embodiments, it should be understood that those skilled in the art might make many changes and substitutions without departing from the spirit and the scope of the present invention which is defined only by the appended claims.

What is claimed is:

1. An apparatus for manufacturing a glass-base-material, which is a base material of an optical fiber, comprising:
   a driving unit that drives a glass rod around an axis of said glass rod said driving unit comprising a first section and a second section;
   a burner for accumulating glass soot around an outside surface of said glass rod, which is driven by said driving unit, to form said glass-base-material;
   a weight-deducting unit, on which said driving unit is mounted, for deducting a predetermined weight from a total weight of said driving unit and said glass-base-material formed by said burner, said weight-deducting unit comprising:
      a base supported by a supporting member, said base comprising a first part and a second part opposite to said first part with respect to said supporting member, said first part mounting thereon said first section of said driving unit, and said second part mounting thereon said second section of said driving unit; and
      a counterweight mounted on said second part of said base; and
   a measuring unit provided under said weight-deducting unit for measuring said total weight, from which said predetermined weight is deducted by said weight-deducting unit.

2. An apparatus as claimed in claim 1, wherein
   a said base is supported by said supporting member so that said base rotates around said supporting member; and
   said counterweight is mounted on said base to balance a weight of said driving unit with a weight of said glass-base-material.

3. An apparatus as claimed in claim 2, wherein said counterweight is arranged on one end of said base, and said measuring unit is arranged under an other end of said base across said supporting member.

4. An apparatus as claimed in claim 1, wherein said driving unit comprises a motor formed on said base, said measuring unit being located on an end of said base which is opposite to said motor.

5. An apparatus as claimed in claim 1, wherein said weight-measuring unit comprises a load cell.

6. An apparatus as claimed in claim 1, wherein said driving unit comprises a pair of driving units provided on opposing ends of the glass rod.

7. An apparatus as claimed in claim 1, wherein said measuring unit comprises a pair of measuring units located on opposing ends of the glass rod.

8. An apparatus as claimed in claim 1, wherein said weight-deducting unit further comprises:

a pivot member, wherein said base is rotatably connected to said pivot member.

9. An apparatus according to claim 8, wherein said pivot member comprises:

an upper stay connected to said base;

a lower stay; and a balance shaft, wherein said balance shaft rotatably connects said upper stay to said lower stay so that said upper stay and said lower stay rotate around said balance shaft.

10. An apparatus according to claim 9, wherein said upper stay protrudes downward from said base, and wherein said upper stay is arranged substantially on the centerline of said base.

11. An apparatus according to claim 10, wherein said lower stay protrudes upward from a lower base and contacts said upper stay, and wherein said lower stay is arranged substantially on the centerline of said lower base.

12. An apparatus according to claim 8, wherein a pivot member is disposed on opposing ends of said base.

13. An apparatus according to claim 9, wherein said driving unit comprises a motor, said counterweight and said motor being disposed on a first end of said base.

14. An apparatus according to claim 13, wherein said driving unit further comprises:

a drive shaft and a driving pulley connected to said drive shaft, said drive shaft and said driving pulley being located at a second end of said base which is opposite to said first end.

15. An apparatus according to claim 13, wherein said measuring unit is disposed on a lower base below said axis of said glass rod.

16. An apparatus according to claim 1, wherein said measuring unit comprises a display for displaying a measured weight.

17. An apparatus according to claim 1, wherein said measuring unit measures a weight of said glass-base-material at a predetermined time interval.

18. An apparatus according to claim 1, further comprising:

a control unit which controls a supply of raw material to said burner to control a rate of increase of a weight of said glass-base-material.

19. An apparatus as claimed in claim 1, wherein said weight-deducting unit balances a weight of said driving unit with a weight of said glass base material.

20. An apparatus as claimed in claim 1, wherein said weight-deducting unit further comprises a balance shaft which includes said supporting member.

21. An apparatus for manufacturing a glass-base-material, which is a base material of an optical fiber, comprising:

a driving means that drives a glass rod around an axis of said glass rod said driving means comprising a first section and a second section;

a depositing means for accumulating glass soot around an outside surface of said glass rod, which is driven by said driving means, to form said glass-base-material;

a weight-deducting unit, on which said driving means is mounted, for deducting a predetermined weight from a total weight of said driving means and said glass-base-material formed by said depositing means, said weight-deducting unit comprising: a base supported by a supporting member, said base comprising a first part and a second part opposite to said first part with respect to said supporting member, said first part mounting thereon said first section of said driving means, and said second part mounting thereon said second section of said driving means; and a counterweight mounted on said second part of said base; and a measuring means provided under said weight-deducting unit for measuring said total weight, from which said predetermined weight is deducted by said weight-deducting unit.

* * * * *